United States Patent
Franklin, Jr.

[11] Patent Number: 6,109,058
[45] Date of Patent: Aug. 29, 2000

[54] INSULATED FREIGHT CONTAINER WITH RECESSED $CO_2$ SYSTEM

[76] Inventor: Paul R. Franklin, Jr., 5211 W. Beaver St., Jacksonville, Fla. 32254

[21] Appl. No.: 09/167,535

[22] Filed: Oct. 7, 1998

[51] Int. Cl.[7] .................................................. F25D 3/12
[52] U.S. Cl. .................................. 62/384; 62/239; 62/388
[58] Field of Search .............................. 62/384, 388, 239

[56] References Cited

U.S. PATENT DOCUMENTS

| | | | |
|---|---|---|---|
| 4,593,536 | 6/1986 | Fink et al. | 62/384 |
| 4,640,460 | 2/1987 | Franklin, Jr. | 239/2.2 |
| 5,337,579 | 8/1994 | Saia, II et al. | 62/384 |
| 5,398,522 | 3/1995 | Franklin, Jr. | 62/384 |
| 5,415,009 | 5/1995 | Weiner et al. | 62/384 |
| 5,423,193 | 6/1995 | Claterbos et al. | 62/384 |
| 5,460,013 | 10/1995 | Thomsen | 62/388 |
| 5,505,055 | 4/1996 | Franklin, Jr. | 62/74 |

*Primary Examiner*—Ronald Capossela

*Attorney, Agent, or Firm*—Jacobson, Price, Holman & Stern, PLLC

[57] ABSTRACT

A closed loop pipe system is provided for the upper portion of the interior of an insulated storage or transport container. The pipe system includes active pipe sections including spray jet outlets spaced therealong and the active pipe sections are mounted within channel structure recessed within and opening outwardly of at least one insulated wall of the container. The channel structure includes impact plate portions onto which spray jets of liquid $CO_2$ discharged from the outlets impact for deflecting the spray jets of liquid $CO_2$ over a load within the container. The pipe system includes upstanding supply pipes at opposite diagonal portions of the container, each including a valve inlet end opening outwardly of a lower portion of the container and an upper end opening into the closed loop pipe system in a manner defining eductor structure whereby rapid inflow of liquid $CO_2$ under pressure into the closed loop pipe system from either supply pipe will cause circulation of liquid $CO_2$ in one direction through the closed loop pipe system.

18 Claims, 5 Drawing Sheets

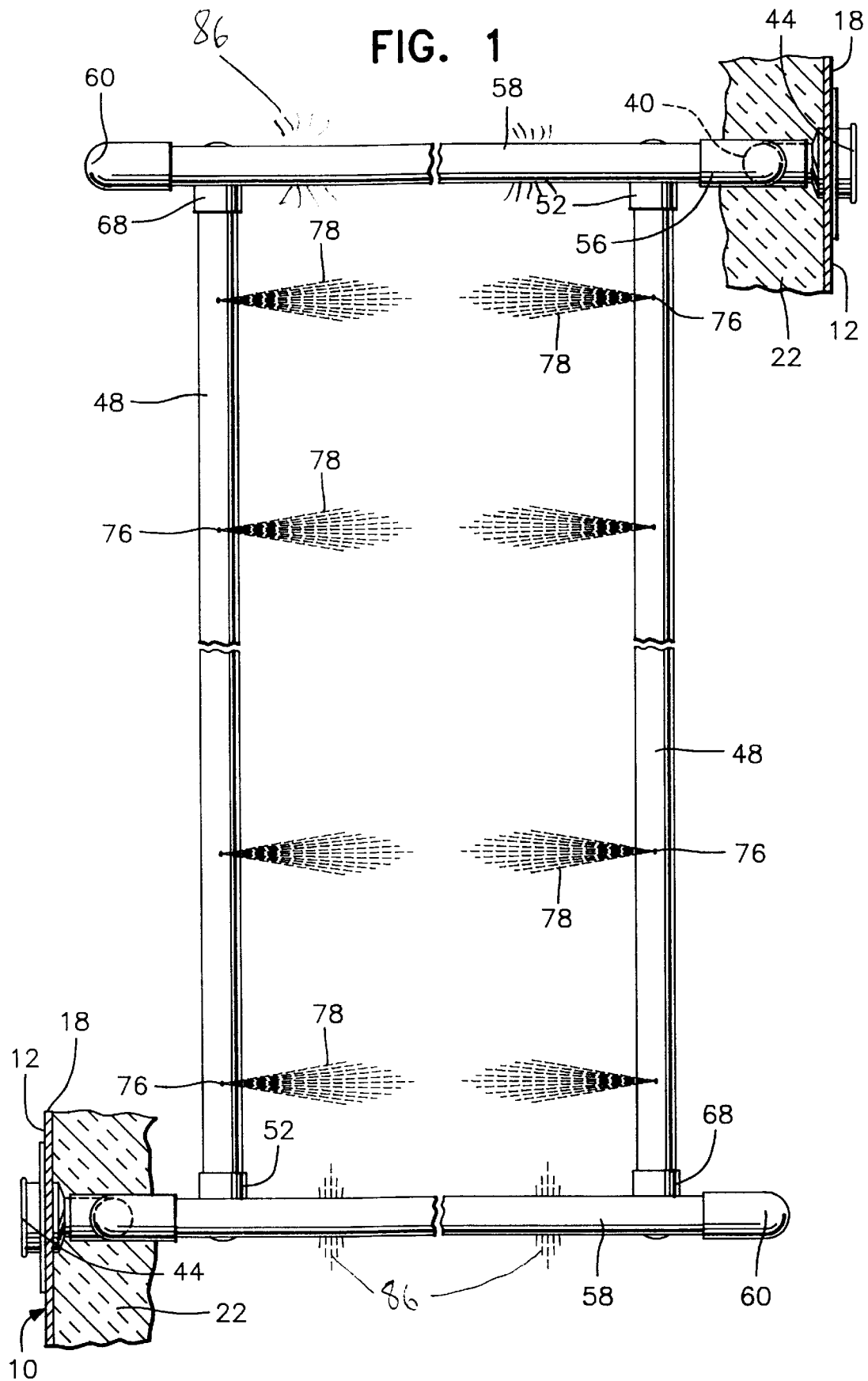

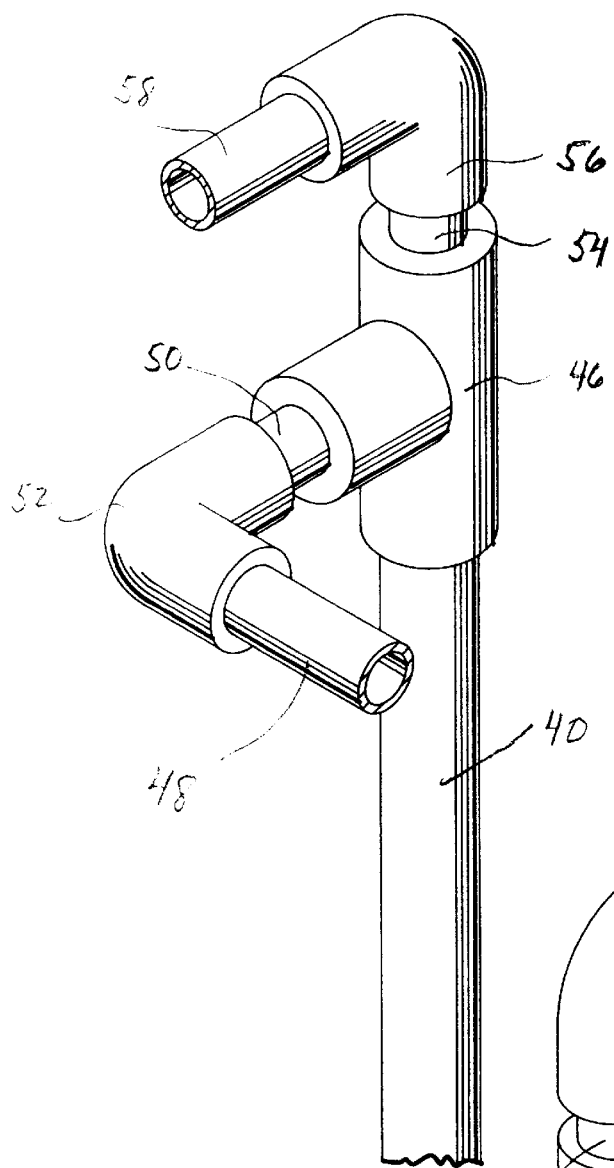
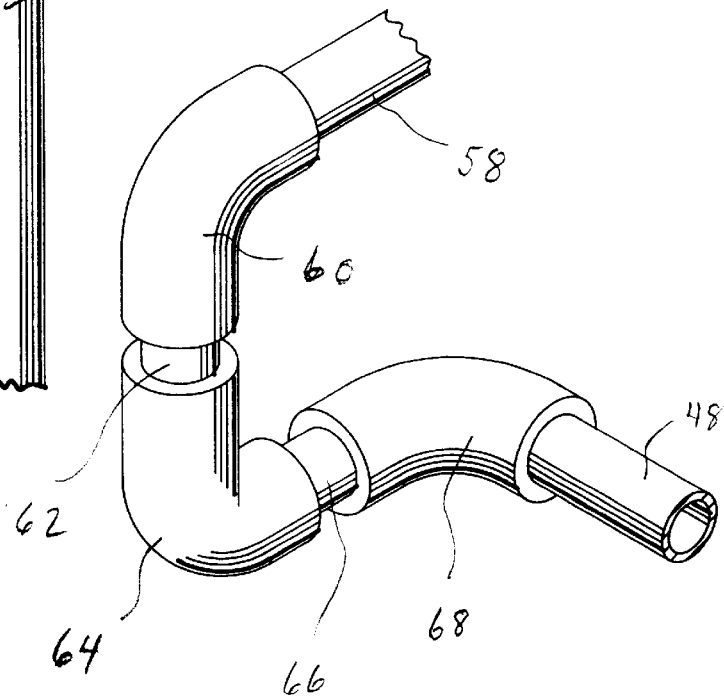

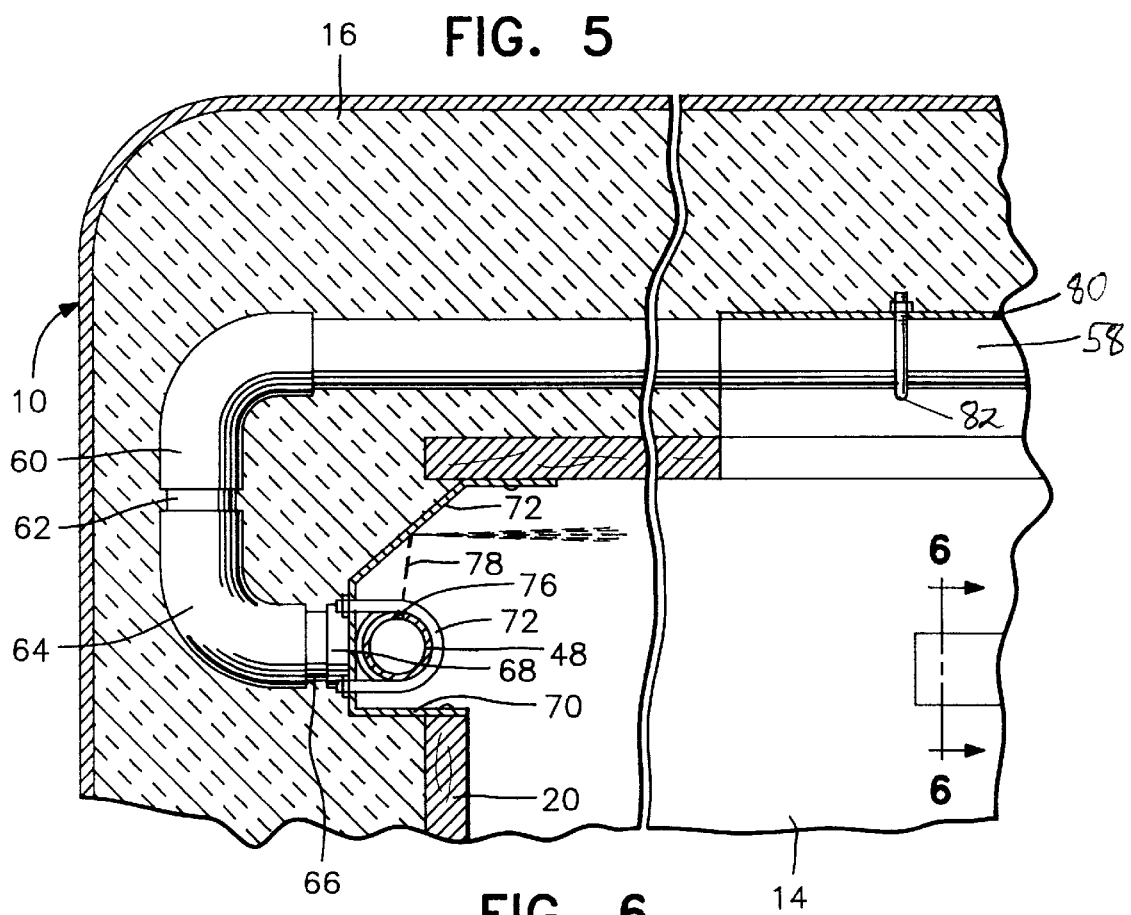
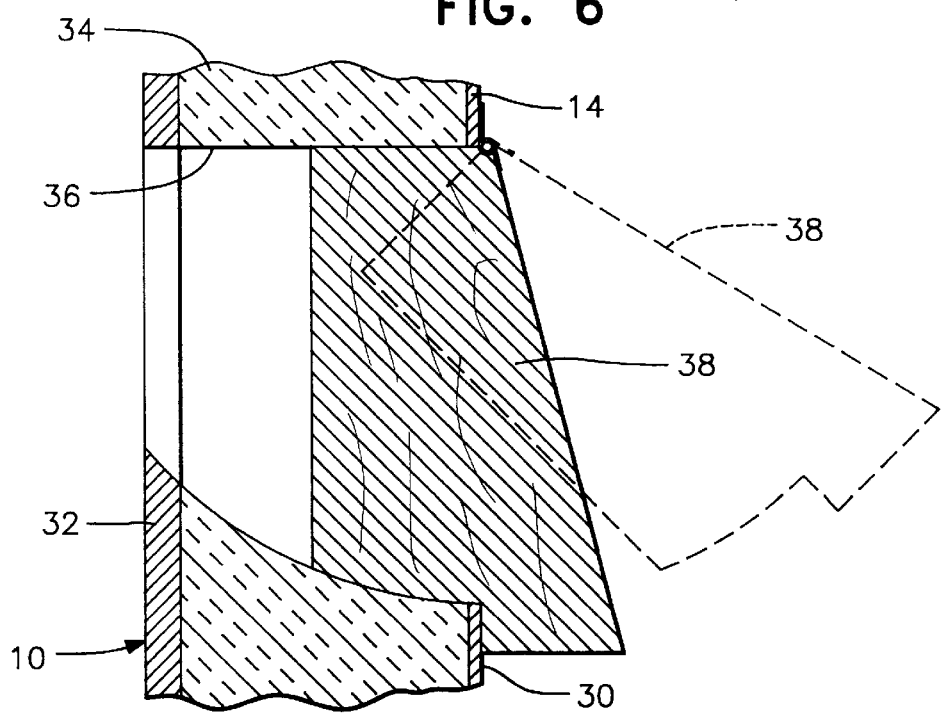

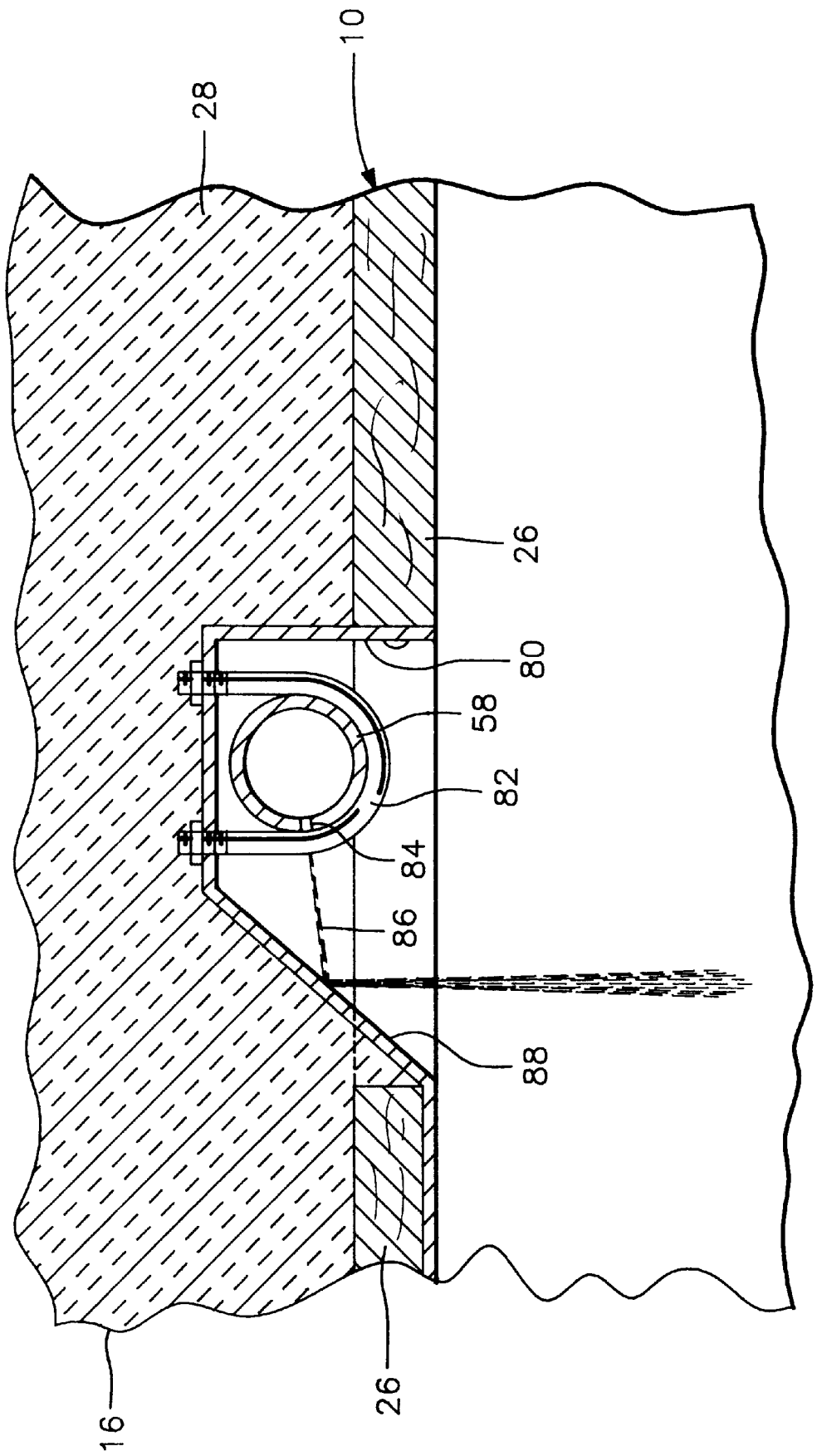

INSULATED FREIGHT CONTAINER WITH RECESSED $CO_2$ SYSTEM

CROSS REFERENCE TO RELATED APPLICATIONS

Not applicable

STATEMENT REGARDING FEDERALLY SPONSORED

RESEARCH OR DEVELOPMENT

Not applicable

BACKGROUND OF THE INVENTION

1. Field of the Invention

This invention relates to the combination of an insulated container for containing frozen materials, such as food stuffs and the like, during storage and/or shipment and a recessed $CO_2$ snow forming assembly for forming $CO_2$ snow within an upper interior portion of the container which then falls onto the top of the frozen materials within the container. The snow forming assembly is recessed into one or more of the insulated walls of the container to allow mechanical loading and unloading of the container without fear of the load or mechanical loader carrying the load within the container striking and damaging any portion of the $CO_2$ forming assembly.

2. Description of Related Art

Various $CO_2$ snow and ice makers heretofore have been provided to form $CO_2$ snow or ice at varying temperatures within containers such as transport containers of railcars, truck trailers and the like for freezing or chilling loads within such containers.

My prior U.S. Pat. Nos. 4,640,460, 5,398,552 and 5,505,055 disclose $CO_2$ snow and ice makers of this type, but the structures disclosed in my prior patents have generally been exposed around the interior of the container. Such structures are therefore subject to contact by loads being moved into or out of the respective containers and/or contact by mechanical loaders carrying such loads within the containers. Such contact may cause damage to the $CO_2$ snow or ice making structure, often rendering the $CO_2$ snow and ice makers inoperable.

SUMMARY OF THE INVENTION

In order to improve the effectiveness of the prior art systems, the $CO_2$ snow forming assembly of the instant invention is constructed to be recessed into the top, end and/or side walls of the elongated container used to hold frozen or refrigerated materials for storage or transport. The $CO_2$ snow forming assembly is further configured to dispense the high pressure liquid $CO_2$ in spray form from a plurality of outlets onto impact surfaces inclined between about 20° and about 60° relative to the direction in which the sprays impinge upon the impact surfaces. By impacting the high pressure spray jets of $CO_2$ onto inclined impact surfaces in this manner a greater quantity of $CO_2$ snow is formed for every pound of liquid $CO_2$ discharged from the aforementioned outlets. The inclined impact surfaces are preferably designed into the surface of the wall adjacent each nozzle.

Therefore, not only is it desirable to provide recessed piping for a liquid $CO_2$ spray jet system or assembly within a container to be chilled, but it is also important to recess the impact surfaces of the assembly in order to ensure that the impact surfaces also will not be damaged. This is accomplished in the present invention by incorporating the impact surfaces into elongated channel members recessed into the applicable wall and positioning the "active" piping containing the liquid $CO_2$ outlets in the channel members such that the $CO_2$ spray jets impact on an inclined wall of the channels to redirect the spray jets inwardly toward the upper portion of the container interior.

The recessed channels open inwardly, thus enabling all of the active piping sections of the $CO_2$ spray jet forming assembly of the present invention to be substantially fully exposed for ready access to the active piping for servicing. Further, the active piping sections of the assembly preferably form a closed circulatory loop for the compressed $CO_2$, and the piping assembly is preferably designed to be "charged" from diagonally opposite corners of the attendant container. The charging of the piping assembly from either diagonally opposite corner is then carried out in such a manner as to provide circulatory flow of liquid $CO_2$ continuously through the closed loop piping to thereby maintain the liquid $CO_2$ being discharged from the active piping at the lowest possible temperature subsequent to commencing of the system charging process.

It is therefore an object of this invention to provide a $CO_2$ snow forming system for use within storage and transport containers including insulated walls in which the piping for the $CO_2$ snow forming system is recessed within the inner wall portions of the containers, thereby to ensure that a load being moved into or out of the container or a mechanical loader handling such a load will not damage the piping of the $CO_2$ snow forming system.

Another object of this invention is to provide a snow forming assembly or system in accordance with the preceding object and which also includes impact surfaces closely adjacent the high pressure liquid $CO_2$ spray outlets of the assembly onto which the high pressure spray jets of liquid $CO_2$ may impact to thereby increase the quantity of $CO_2$ snow which may be formed by each pound of liquid $CO_2$ discharged by the system or assembly.

Yet another object of this invention is to provide an assembly in accordance with the preceding objects wherein not only the active piping of the assembly for discharging spray jets of liquid $CO_2$ is recessed, but also the impact surfaces for the spray jets are recessed in a manner to avoid impact damage by loads or loading equipment being moved into and out of the associated container.

Still another object of this invention is to provide an assembly in accordance with the preceding objects in which the impact surfaces are formed by an inclined wall of elongated channel members embedded or recessed within one or more inner wall portions of the container, and the active piping is positioned and supported within the channel members so that the $CO_2$ liquid jet spray from the outlets of the active piping impacts on the inclined wall of the channels and is redirected inwardly toward the upper portion of the container interior.

A further object of this invention is to configure the active piping of the assembly into a closed loop recessed into the side, end and/or top walls of the container in order to provide continuous circulatory flow of liquid $CO_2$ through the active piping which maintains the liquid $CO_2$ at the lowest possible temperature at discharge once the system has reached steady-state in the snow or ice making operation.

A still further object of this invention is to provide an assembly in accordance with the preceding objects wherein the "active" piping sections of the system for spray discharging high pressure jets of liquid $CO_2$ therefrom are substantially fully exposed for maintenance thereon.

A final object of this invention to be specifically enumerated herein is to provide an apparatus in accordance with the preceding objects which will conform to conventional forms of manufacture, be of simple construction and easy to use so as to provide an installed $CO_2$ snow or ice maker that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a fragmentary, schematic top plan view of the $CO_2$ snow forming assembly of the instant invention operatively associated with an insulated railway box car;

FIG. 2 is a fragmentary perspective view of one end corner section of the piping system used in the assembly of FIG. 1;

FIG. 3 is a fragmentary perspective view of a second end corner section of the piping system used in the assembly of FIG. 1;

FIG. 5 is a fragmentary vertical sectional view illustrating the manner in which the corner section illustrated in FIG. 3 along with a section of active piping and channel member are recessed within the side and top walls of the insulated box car;

FIG. 6 is a fragmentary vertical sectional view taken substantially upon the section line 6—6 of FIG. 5 and illustrating a typical pressure relief door provided in one end wall of the box car for relieving pressure therein during "charging" of the assembly; and FIG. 7 is a fragmentary vertical sectional view illustrating the manner in which the opposite end portions of the active piping and associated channel member are upwardly recessed within the insulated top wall of the box car.

DESCRIPTION OF THE PREFERRED EMBODIMENT

Figure 4:
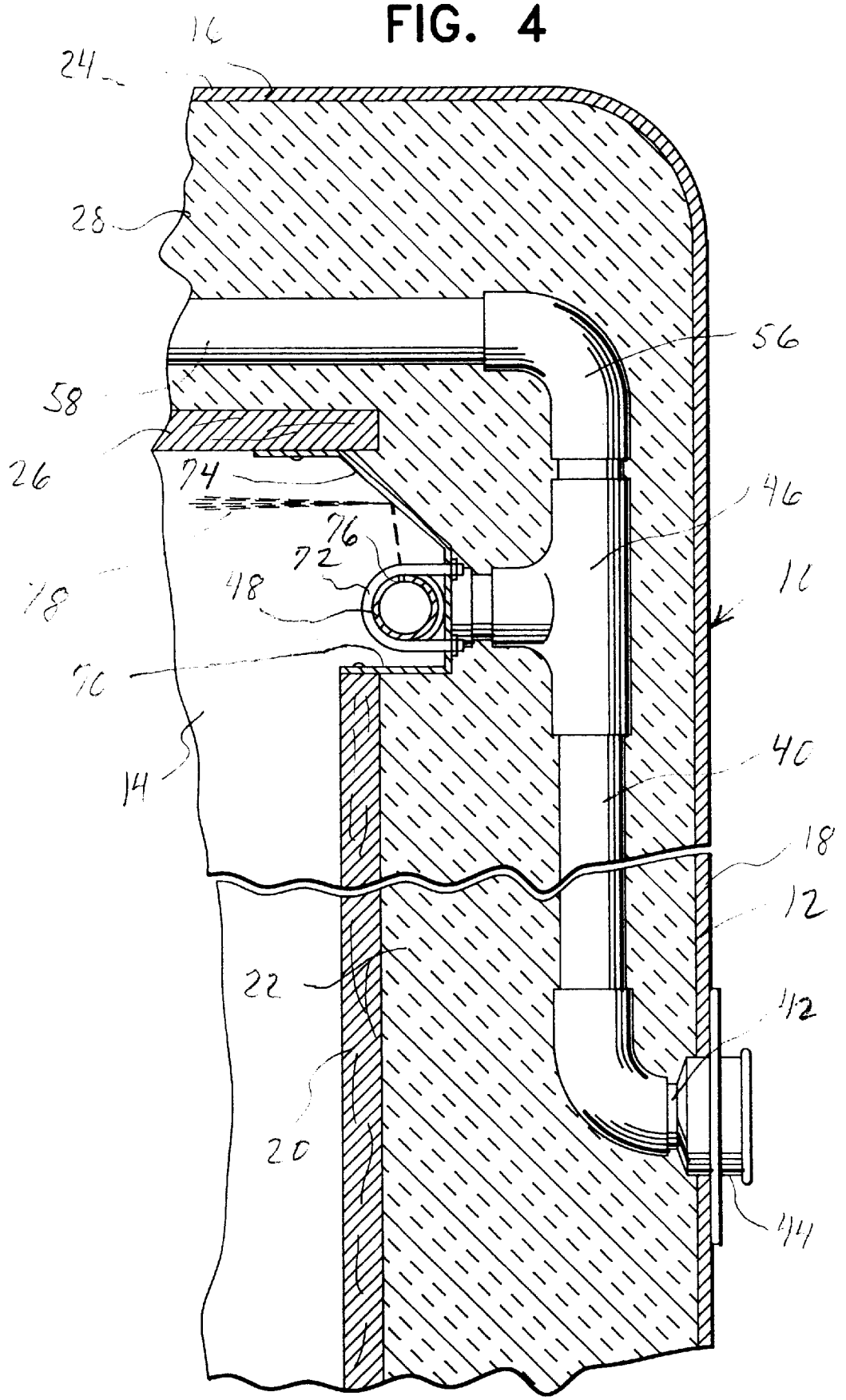
FIG. 4 is a fragmentary vertical sectional view illustrating the manner in which the corner section illustrated in FIG. 2 is recessed within the insulated side and top walls of a typical insulated box car.

Although only one preferred embodiment of the invention is explained in detail, it is to be understood that the invention is not limited in its scope to the details of construction and arrangement of components set forth in the following description or illustrated in the drawings. The invention is capable of other embodiments and of being practiced or carried out in various ways. Also, in describing the preferred embodiment, specific terminology will be resorted to for the sake of clarity. It is to be understood that each specific term includes all technical equivalents which operate in a similar manner to accomplish a similar purpose.

Referring now more specifically to the drawings, the numeral 10 generally designate a box car in FIG. 1. The box car 10 includes upstanding opposite longitudinal side walls 12 and upstanding opposite end walls 14 (FIG. 5) as well as a top wall 16 interconnecting the upper margins of the side and end walls 12 and 14.

As may best be seen from FIG. 4, the side walls 12 each include an outer skin 18, an inner panel 20 of plywood or other conventional liner material and a relatively thick layer 22 of insulation disposed between the outer skin 18 and the inner panel 20. Further, the top wall 16 includes an outer skin 24, an inner panel 26 corresponding to the inner panel 20 and a thick layer 28, also of insulation between the outer skin 24 and the inner panel 26. Still further, each end wall 14 includes an outer skin 30, an inner panel 32 corresponding to the inner panels 20 and 26 and a thick layer 34 of insulation disposed between the outer skin 30 and inner panel 32.

While the preferred embodiments are described with reference to a box car, the box car 10 represents only one type of insulated container with which the $CO_2$ snow forming assembly of the present invention may be associated. Other containers which may include the $CO_2$ snow forming assembly of the instant invention include insulated shipping and storage containers, insulated truck bodies and any other large volume insulated container for the storage or transport of frozen or refrigerated materials.

The box car 10 also includes a bottom wall or floor (not shown) extending between and interconnecting and supporting the lower marginal portions of the side and ends walls 12 and 14. In addition, each end wall 14 includes an excess pressure relief port 36 formed therethrough. In a preferred configuration, the relief port 36 has a gravity closable hinged and insulated door 38 operatively associated therewith whereby gas pressure within the box car or container 10 may be vented therefrom as a buildup of gas pressure in the box car or container 10 occurs.

Referring again to FIGS. 1 and 4, diagonally opposite corner portions of the box car or container 10 include a pair of vertical supply pipes 40 mounted within the thick insulated layers 22. The supply pipes 40 include lower ends 42 equipped with closable fill valves 44 opening through lower portions of the associated side walls 12 and upper ends equipped with eductor T's 46. Longitudinal "active" pipes 48 extend in opposite directions along the side walls 12 from the eductor T's 46 and are communicated with the latter by inwardly directed nipples 50 and elbows 52. The upper ends of the T's 46 include nipples 54 opening into elbows 56. The outer end of elbows 56 receive one end of transverse "active" pipes 58 which extend toward the opposite sides of the box car or container 10 and terminate in downturned elbows 60 discharging into nipples 62 which in turn terminate in laterally inwardly discharging elbows 64 communicated with the adjacent end of the other longitudinal active pipe 48 through a nipple 66 and elbow 68. The piping illustrated in FIGS. 2, 3, 4 and 5 is duplicated at each end of the box car or container 10.

The active longitudinal pipes 48 are clamped within sheet metal channels 70 by U-bolts 72. The channels 70 in turn are preferably supported from adjacent marginal portions of the inner panels 20 and 26 by any suitable connection, as may best be seen from FIGS. 4 and 5. The upper portions of the channels 70 define inclined impact plates 74 and the active pipes 48 each include a plurality of longitudinally spaced upwardly opening discharge bores or openings 76 formed therein for upwardly discharging high pressure spray jets of liquid $CO_2$ onto the impact plates 74. The discharge of the liquid $CO_2$ spray jets is preferably at an angle of between about 20° and about 60° relative to the surface of the impact plates 74, most preferably at an angle of about 30° to about 50°. In one prototype rail car, the angle is about 45°.

Further, the impact plates are preferably spaced from the discharge bores a distance at their approximate impact mid-point of about ¼ inch to about 1½ inches, more preferably between about ¼ inch to about ¾ inches. In one prototype rail car, the distance is about ½ inch. A shorter distance than ¼ inch does not permit sufficient aeration for the liquid $CO_2$ stream before impact and a longer distance than 1½ inches has the potential for the spray jets to lose efficiency before impact. The spray jets 78 strike the impact plates 74 and are thus deflected outwardly therefrom in a generally horizontal direction toward the longitudinal center of box car 10. As shown in FIGS. 4 and 5, the active longitudinal pipes 48 within channels 70 are preferably positioned near the top of inner walls 20 so that the spray jets 78 are deflected off impact plates 74 closely beneath the inner panel 26 of the top wall 16.

While not preferred, it may be possible to place active pipes 48 at a lower position on the height of inner wall 20 and/or forego use of the impact plates 74. In such configurations, the spray jets 78 would be directed upwardly so as to fall atop the box car or container cargo. Further, it is preferred that impact plates 74 be incorporated into channels 70 and that the spray jets 78 be directed upwardly out of discharge bores 76. However, it is possible to employ impact plates separate from channels 70, and configurations of discharge bores and impact plates could be designed such that the spray jets 78 leave bores 76 in a downwardly direction (below horizontal).

Each of the two transverse or end active pipes 58 has its major extent outside of the insulation thick layer 28, see FIGS. 5 and 7, and is clamped within its own sheet metal channel 80 supported from the inner panel 26. The channel 80 is preferably positioned in a transverse recess in panel 26, see FIGS. 5 and 7. Similar U-bolts 82 are utilized to clamp the active pipes 58 within the channels 80, and the active pipes 58 include discharge bores 84 spaced longitudinally therealong for discharging spray jets 86 of liquid $CO_2$ onto impact plates 88 of the channels 80 corresponding to the impact plates 74. The spray jets 86 are deflected downwardly by the impact plates 88 for depositing $CO_2$ snow onto the end portions of the load (not shown) within the box car or container 10. The channels 80 are spaced inwardly from the end walls 14 of the box car 10 to a point generally above the wheel trucks supporting opposite ends of the box car 10 since the wheel truck end areas of the box car 10 are usually subject to somewhat higher heat loads.

Preferably, supply pipes 40 are constructed of standard 1½ inch diameter stainless steel piping and the active pipes 48 and 58 are made of standard 1 inch diameter stainless steel piping. The corresponding elbows and nipples are also stainless steel and appropriately sized.

The inner panels 20 and 26 obviously may be braced relative to the outer skins 18 and 24 in any convenient manner (not shown). Further, the various piping portions of the liquid $CO_2$ snow forming assembly may be mounted within the box car or container 10 as the container 10 is being constructed or converted into an insulated container. Also, the thick insulation layers 22, 28 and 34 may be introduced after the inner panels 20, 26 and 28 have been erected and braced relative to the outer skins 18, 24 and 30 and the piping assembly and channels 70 and 80, with associated bracing, if any, have been installed.

In operation, liquid $CO_2$ under pressure is admitted into either fill valve 44. As it enters the selected fill valve 44, the $CO_2$ rapidly passes upwardly through the corresponding supply pipe 40 and into the adjacent end of the corresponding active pipe 58 through the associated T 46. While some minor flow may enter the end of the adjacent active pipe 48, the major portion of the $CO_2$ flows straight past the T-section and nipple 50 and flows directly into elbow 56 and pipes 58. The liquid $CO_2$ in pipe 50 then passes through pipe 58 to the opposite side of the box car 10 and into the adjacent end of the opposite side active pipe 48. The liquid $CO_2$ then passes through the last mentioned active pipe 48 to the opposite end of the box car 10 and into the opposite end active pipe 58, through that active pipe 58 into the elbow 56 at the far end, the corresponding nipple 54, T 46, nipple 50 and elbow 52 and into the adjacent end of the active pipe 48 nearest to the supply pipe 40 in use. Thereafter, the liquid $CO_2$ passes through the last mentioned active pipe 48 down the length of the box car 10 back to the original T 46 through which the liquid $CO_2$ passes from the supply pipe 40 being used to "charge" the piping. Of course, once the pressure of liquid $CO_2$ is built up in the piping system, liquid $CO_2$ is discharged from the various discharge bores 76 and 84 to form the various spray jets 78 and 86 hereinbefore described.

As the liquid $CO_2$ is discharged from the active pipe 48 into the T 46 being used to supply liquid $CO_2$ to the system, the rapid flow of liquid $CO_2$ up the supply pipe 40 and through the T 46 causes liquid $CO_2$ within the adjacent active pipe 48 to be drawn again into the main inflow of liquid $CO_2$ by eductor action. Thus, the liquid $CO_2$ pumped into the piping system which is not discharged from the discharge bores 76 and 84 is continuously recirculated through the system. In this manner, during the steady-state formation of liquid $CO_2$ snow within the box car 10, a substantial portion of the liquid $CO_2$ supplied to the system is recirculated through the closed loop portion comprising the active pipes 48 and 58 and is thus maintained at a lower temperature until discharged from either the discharge bores 76 or the discharge bores 84. This allows a greater amount of $CO_2$ snow to be formed within the box car 10 for every pound of liquid $CO_2$ supplied to the piping system through the flow valve 44.

It will be observed that the active piping system and closed loop of the present invention can be charged and operated from either supply pipe 40. Further, by reason of the Ts 46 and the eductor effect in the design of the closed loop, the recirculating liquid $CO_2$ is always moving in the same direction regardless of whether the liquid $CO_2$ is fed from one supply pipe 40 or the other, or both. The direction is counterclockwise in FIG. 1.

Inasmuch as all of the active piping as well as the supply pipes 40 is recessed within the top and side walls 16 and 12, loads being moved into or out of the box car 10 as well as the mechanical loaders supporting and moving the loads cannot impact with the piping to cause damage thereto. In addition, those portions of the channels 70 and 80 defining the impact plates 74 and 88 also are supported in a recessed manner and thus may not be impacted by the aforementioned loads or loaders.

The foregoing is considered as illustrative only of the principles of the invention. Numerous modifications and changes readily will occur to those skilled in the art. For example, the piping assembly has been described with two longitudinal active pipes 48 and two transverse or end active pipes 58. Assemblies in accordance with the present invention could be designed with three or more longitudinal active pipes or transverse pipes so long as the pipes are properly recessed and preferably form a closed loop for recirculating the $CO_2$ during discharge through the discharge bores or opening. Further, numerous configurations for the impact plates and supply piping could be designed. Therefore, it is not desired to limit the invention to the exact construction and operation shown and described and, accordingly, all suitable modifications may be resorted to falling within the scope of the invention.

What is claimed as new is as follows:

1. In combination, an elongated container including interconnected pairs of opposite, upstanding and insulated side and end walls and an insulated top wall extending between and interconnecting said side and end walls, a $CO_2$ snow forming assembly for the interior of said container, said snow forming assembly including elongated generally horizontal active piping recessed in and extending along at least one of said walls and defining liquid $CO_2$ outlets spaced therealong opening into the upper extremity of the interior of said container, said active piping being mounted within channel structure provided therefor and recessed in said at least one wall, said snow forming assembly also including an upstanding supply pipe housed within one of said insulated walls and including a lower valved inlet end opening outwardly of the corresponding wall and upper discharge end opening into said active piping in a manner operative to effect circulation of liquid $CO_2$ through said active piping.

2. The combination of claim 1, wherein said snow forming assembly includes at least two upstanding supply pipes, one at each end of said container housed in diagonally opposite portions of opposed insulated side or end walls, each said supply pipe having lower valved inlet ends opening outwardly of the corresponding wall and upper discharge ends opening into said active piping in a manner defining eductor means operative to effect circulation of fluid through said active piping responsive to rapid inflow of liquid $CO_2$ from said supply pipe into said active piping.

3. The combination of claim 1, wherein said active piping includes opposite side and opposite end portions recessed in said side walls and top wall, respectively, to form a closed loop.

4. The combination of claim 3, wherein said opposite end portions of said closed loop are recessed upwardly in said top wall and spaced inwardly of said end walls.

5. The combination of claim 2, wherein said supply pipes are housed within said side walls adjacent diagonally opposite corner portions of said container.

6. The combination of claim 1, wherein said active piping includes opposite side and opposite end portions each defining liquid $CO_2$ outlets spaced therealong opening into the upper extremity of the interior of said container and recessed in said side walls and opposite end portions of said top wall, respectively.

7. In combination, an elongated container including interconnected pairs of opposite, upstanding and insulated side and end walls and an insulated top wall extending between and interconnecting said side and end walls, a $CO_2$ snow forming assembly including a generally horizontal closed loop having opposite side and opposite end portions recessed in and extending along upper marginal portions of said side walls and opposite end portions of said top wall, respectively, said opposite side and end portions including liquid $CO_2$ outlets spaced therealong opening into the upper extremity of the interior of said container, said snow forming assembly including an upstanding supply pipe at each end of said container, said supply pipes being housed within one pair of said pairs of opposite walls and including valved lower inlet ends opening outwardly of the corresponding pair of walls and upper discharge ends each opening into said closed loop in a manner defining eductor means operative to effect circulation of fluid through said closed loop responsive to rapid flow of liquid $CO_2$ from either supply pipe into said closed loop.

8. The combination of claim 7, wherein said fill pipes are housed within said side walls adjacent diagonally opposite corners of said container.

9. The combination of claim 8, wherein said discharge ends open directly into corresponding ends of corresponding end portions of said closed loop and the adjacent ends of said side portions of said closed loop open laterally into said fill pipes slightly upstream from said end portions of said loop header structure to form said eductor means.

10. In combination, a container including opposite upstanding insulated side and end walls and a floor and an insulated top wall extending between and interconnecting said side and end walls to form an interior of said container, each of said walls including an outer skin and an inner panel as well as insulation material disposed between said skins and inner panels, a $CO_2$ snow forming assembly for said interior of the container, including inwardly opening channel members recessed in and extending along upper margins of said side walls and downwardly opening channel members recessed in and extending along opposite end margins of said top wall, active piping supported within and extending along said channel members and at least one supply pipe opening outwardly of said container and connected to said piping to deliver liquid $CO_2$ to said piping, said active piping having spray jet outlets spaced therealong, said channel members defining impact plates spaced therealong opposing said outlets and disposed at an angle between about 20° and about 60° relative to the direction in which said spray jet outlets open and onto which liquid $CO_2$ being discharged from said outlets may impinge to direct said liquid $CO_2$ toward said interior of the container.

11. The combination of claim 10, wherein the impact plates of said channel members extending along said side walls are positioned relative to the corresponding spray jet outlets such that spray jets of liquid $CO_2$ impinging thereon will be deflected generally horizontally inwardly from said side walls.

12. The combination of claim 10, wherein the impact plates of said channel members extending along opposite end portions of said top wall are arranged relative to the corresponding spray jet outlets such that spray jets of liquid $CO_2$ impinging thereon will be directed generally downwardly from the last mentioned channels into the opposite end portions of said container.

13. The combination of claim 10, wherein said supply pipe opens into a closed loop of said active piping in a manner to form eductor means operative to cause circulation of liquid $CO_2$ through said closed loop during supply of liquid $CO_2$ to said closed loop.

14. A $CO_2$ snow forming assembly for directing $CO_2$ snow to an interior of a container having opposite upstanding insulated side and end walls, a bottom wall and an insulated top wall which comprises active piping including opposite side and opposite end portions for recess in said side walls and top wall, respectively, said active piping having spray jet outlets spaced therealong, a supply pipe opening outwardly of said container and connected to said piping to deliver liquid $CO_2$ to said piping, and impact plates spaced opposite each said outlet and disposed at an angle between about 20° and about 60° relative to the direction in which said spray jet outlets open and onto which liquid $CO_2$ discharged from said outlets impinges to direct said liquid $CO_2$ toward said interior of the container.

15. The $CO_2$ snow forming assembly of claim 14, wherein said impact plates are formed in elongated channels in which said active piping is positioned and supported.

16. The $CO_2$ snow forming assembly of claim 15, wherein said elongated channels and supported active piping are recessed in one or more of said insulated walls so as to avoid impact with a load or mechanical loader during movement within said interior.

17. The $CO_2$ snow forming assembly of claim 14, wherein said opposite side and opposite end portions of said active tubing form a closed piping loop in which liquid $CO_2$ continuously circulates during steady-state operation of said $CO_2$ snow forming assembly.

18. The $CO_2$ snow forming assembly of claim 17, wherein said supply pipe opens into said closed piping loop in a manner to form eductor means operative to cause said continuous circulation of the liquid $CO_2$ through said closed loop during steady-state operation of said snow forming assembly.

* * * * *